United States Patent [19]

Nishiguchi et al.

[11] Patent Number: 4,504,940
[45] Date of Patent: Mar. 12, 1985

[54] STYLUS FOR USE WITH VIDEO DISC AND METHOD OF GRINDING SUCH STYLUS

[75] Inventors: Takashi Nishiguchi, Tokyo; Shingo Tamura, Yokohama, both of Japan

[73] Assignee: Hitachi, Ltd., Tokyo, Japan

[21] Appl. No.: 483,174

[22] Filed: Apr. 8, 1983

[30] Foreign Application Priority Data

Apr. 9, 1982 [JP] Japan ................... 57-59129

[51] Int. Cl.³ ................... H04N 5/80; G11B 9/06
[52] U.S. Cl. ................... 369/126; 369/173; 51/283 R
[58] Field of Search ............ 369/126, 173; 51/283 R, 51/281 R

[56] References Cited

U.S. PATENT DOCUMENTS

| | | | |
|---|---|---|---|
| 3,826,877 | 7/1974 | Leedom et al. | 369/126 |
| 4,162,510 | 7/1979 | Keizer | 369/126 |
| 4,165,560 | 8/1979 | Matsumoto | 369/173 |
| 4,287,689 | 9/1981 | Mindel et al. | 369/126 |
| 4,297,312 | 10/1981 | Carroll et al. | 369/126 |
| 4,450,551 | 5/1984 | Kudo et al. | 369/173 |

*Primary Examiner*—Donald McElheny, Jr.
*Attorney, Agent, or Firm*—Antonelli, Terry & Wands

[57] ABSTRACT

A stylus suitable for use with a video disc player of a type in which signals representing changes in electrostatic capacity with respect to a video disc are detected, including a scanning surface brought into contact with the video disc for scanning same, a plurality of inclined surfaces, and a plurality of ridges formed by the inclined surfaces. At least one of several meeting points of the plurality of ridges located in a direction in which scanning is performed is chamfered to render the point blunt. A stylus of the aforesaid shape is produced by a grinding method consisting in using a grinder pan composed of a plate of soft resin having a coat of hard material applied to its surface and forcing a forward end of a stylus against such grinding pan.

5 Claims, 14 Drawing Figures

STYLUS FOR USE WITH VIDEO DISC AND METHOD OF GRINDING SUCH STYLUS

BACKGROUND OF THE INVENTION

This invention relates to styli suitable for use with video disc players of a type in which signals representing changes in electrostatic capacity with respect to a video disc are detected (hereinafter an electrostatic capacity type) and methods of producing such styli, and more particularly it is concerned with a stylus of a shape which difficulty damages the video disc in a reproducing mode and a method of grinding a stylus suitable for obtaining such shape by working on a stylus material.

In video disc players of the electrostatic capacity type, it is essential that the styli do not damage video discs. To this end, it is effective to provide a stylus with a blunt tip at the forward end of its scanning surface in the direction in which it moves in sliding movement while being maintained in contact with a disc. One example of the art of obtaining a blunt tip at the forward end of the scanning surface of a stylus in its sliding direction is disclosed in Japanese Utility Model Laid-Open No. 78501/79 and Japanese Utility Model Laid-Open No. 78502/79 which each show a stylus suitable for use with a video disc having a shape such that a ridge at the forward end portion of the scanning surface of the stylus is continuously rounded and a working method of obtaining such shape. In the shape disclosed in these documents, a portion at which ridges defining the contour of the scanning surface meet each other and a ridge at which one inclined surface meets another inclined surface are rounded, to obtain a continuously rounded ridge. When the ridge is not rounded, the tip of the scanning surface would become sharp. However, when it is rounded, the tip of the scanning surface would become rounded, to thereby enable damage to the video disc to be avoided. The process for rounding the ridge consists in forcing a forward end portion of a stylus or a portion corresponding to the aforesaid ridge at which one inclined surface meets another inclined surface into a sheet-like lap having a diamond compound applied thereto as the latter undergoes elastic deformation. However, some disadvantages are associated with this working process. Difficulties would be encountered in setting working conditions, such as grinding pressure, for obtaining a rounded ridge. Particularly in the vicinity of the point of contact between the forward end portion of the stylus and the sheet-like lap, the grinding pressure might become too high locally to obtain optimum working condition in which the diamond compound is kept in position to properly perform its function without escaping. The result of this would be that a portion near the forward end portion would only be worked on and the forward end portion itself would not be worked on. Thus, the ridge would become sharper after working than before working, thereby causing a large decline in yield.

SUMMARY OF THE INVENTION

This invention has been developed for the purpose of obviating the aforesaid disadvantages of the prior art. Accordingly one object of the invention is to provide a shape of a stylus suitable for use with a video disc player which difficultly causes damage to a video disc and which is easy to fabricate.

Another object is to provide a grinding method enabling working on a stylus to obtain the aforesaid shape to be readily achieved.

An outstanding characteristic of the invention enabling the aforesaid first object to be accomplished is that in a tip section of a stylus, an edge portion, such as a ridge or a portion at which ridges cross each other which is liable to damage the video disc, is rendered blunt by means of chamfering which is easy to perform, rather than by rounding as has hitherto been the case.

Another outstanding characteristic enabling the aforesaid second object to be accomplished is to use a grinder pan for grinding the edge portion of the scanning surface of a stylus which comprises a soft resin layer, formed of vinyl chloride, acrylic resin, ultraviolet setting resin (UV resin), etc., and a coating of hard material, such as $SiO_2$, $Al_2O_3$, etc.

DETAILED DESCRIPTION OF THE PREFERRED EMBODIMENTS

Figure 1:
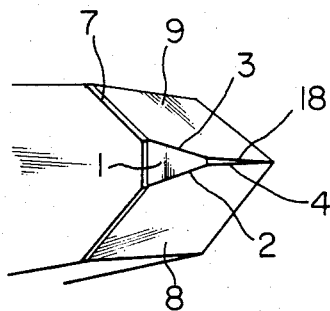
FIG. 1 is a perspective view of the stylus comprising one embodiment of the invention, showing its shape.
Figure 2:
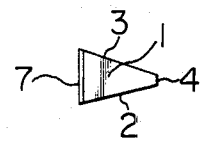
FIG. 2 is a view in explanation of the shape of the scanning surface of the stylus shown in FIG. 1.

Preferred embodiments of the invention will now be described by referring to the accompanying drawings. FIGS. 1 and 2 show the scanning section side of the stylus comprising one embodiment of the invention including a scanning surface 1 having a tip 4 and defined by ridges 2 and 3 and an electrode surface 7. 8 and 9 are inclined surfaces. In the embodiment of stylus in conformity with the invention shown in these figures, a ridge at which the two inclined surfaces 8 and 9 meet each other is not rounded as has been the case with the prior art but it is chamfered as indicated at 18, while the tip 4 of the scanning surface 1 is substantially in the form of a straight line of a certain width, as shown.

Figure 3:
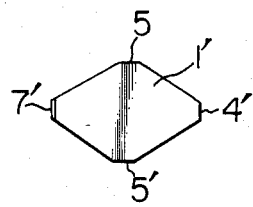
FIG. 3 is a view in explanation of the shape of the scanning surface of the stylus comprising another embodiment of the invention.

FIG. 3 shows another embodiment of stylus in conformity with the invention which includes a scanning surface 1' of a lozenge shape having a tip 4'. In this embodiment, it is not only the tip 4' but also corners 5 and 5' at which ridges formed by the inclined surfaces meet each other that are chamfered, to provide a substantially straight line of a certain width at the tip 4' and the corners 5 and 5', as shown.

Figure 4:
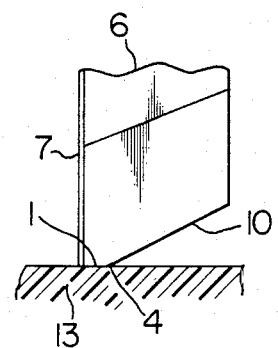
FIGS. 4 and 5 is a view in explanation of the process in which damage may be caused to a video disc by a stylus.
Figure 5:
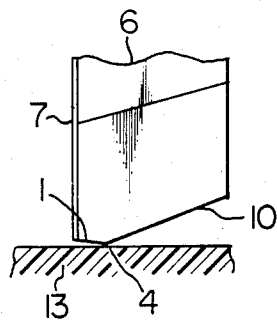

The effect achieved by the chamfering will be described. The effect achieved by the shape of the stylus having a chamfer might be said to be substantially equivalent to that achieved by the shape of the stylus having a rounded ridge, so long as prevention of damage to the video disc is concerned. The effect achieved by the provision of a chamfer will be described in detail by referring to the process of damage caused to a video disc. In normal operation, the scanning surface 1 is in contact with a video disc 13 in one plane as shown in FIG. 4. However, when the stylus tilts forwardly due to its dynamic behavior, damage would be caused to the video disc 13 because the meeting point between the scanning surface 1 and a ridge 10 is brought into contact with the video disc 13 if the tip of the scanning surface 1 were not rendered blunt. Thus, when the condition shown in FIG. 5 occurs, damage to the video disc 13 would be lessened if the tip 4 of the scanning surface 1 or the corners 5 and 5' thereof had a substantial area and a low surface pressure. Thus it would be appreciated that the shape according to the invention in which the tip of the scanning surface of a stylus is rendered blunt by chamfering the tip of the scanning surface and the corners thereof, not by rounding the ridge, can achieve excellent results in avoiding damage to the video disc.

Fabrication is easier when chamfering is adopted than when the ridges formed by the surfaces are rounded. Thus the invention makes it possible to obtain a shape of a stylus for use with a video disc which can be produced with high precision finished and at high yield with a reduced number of operation steps in production.

Figure 6:
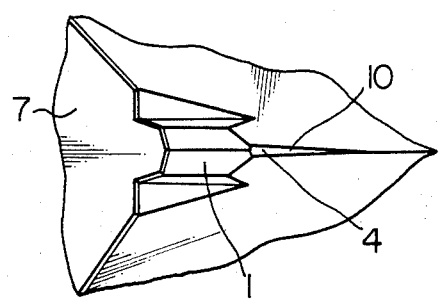
FIG. 6 is a perspective view of the stylus with a guide groove for use with a video disc according to the invention, showing one example of the shape of such stylus.
Figure 7:
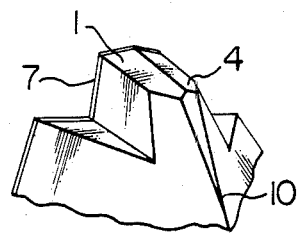
FIG. 7 is a perspective view of the stylus shown in FIG. 6, showing its shape as viewed from the right.
Figure 8:
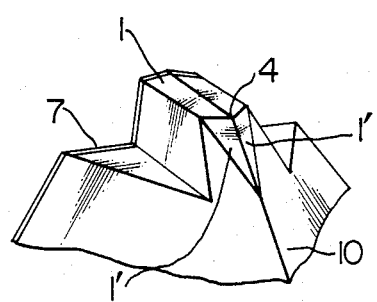
FIG. 8 is a perspective view of a modification of the stylus shown in FIG. 7.

In the embodiments shown and described hereinabove, the invention has been described as being incorporated in the shape of a stylus for use with a video disc having no guide groove. However, it is to be understood that the invention is not limited to the specific form of the stylus and that it can have application in other forms of stylus. FIG. 6 shows a stylus with a guide groove suitable for use with a video disc in which the invention is incorporated. It will be seen that the ridge 10 is chamfered so that the tip 4 of the scanning surface 1 is not a point but has a certain widthwise dimension. FIG. 7 shows the stylus of FIG. 6 as seen from the right direction. Also, as shown in FIG. 8, a surface 1' similar to the scanning surface 1 may be formed contiguously with the scanning surface 1 to extend along the ridge 10 from the tip 4 of the scanning surface 1 at which it meets the ridge 10.

Figure 9:
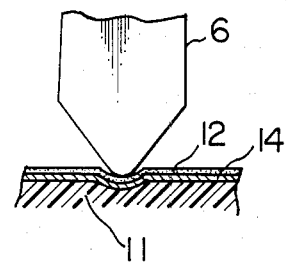
FIG. 9 is a view in explanation of the grinding method comprising still another embodiment of the invention.
Figure 10A:
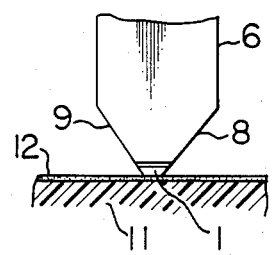
FIG. 10A is a front view showing the condition in which the shape of the stylus according to the invention is obtained by the grinding method shown in FIG. 9.
Figure 10B:
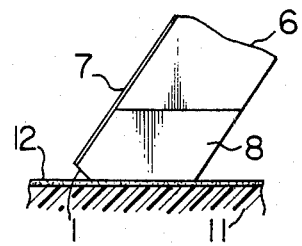
FIG. 10B is a side view of the condition similar to that shown in FIG. 10A.

The method of grinding according to the invention will be described. In the invention, a grinder pan comprising, as shown in FIG. 9, a flat disc 11 formed of soft resinour material, and a coat 12 of hard material applied to the surface of the flat disc 11, to grind the forward end of a stylus 6. The soft resinous material is preferably selected from the group consisting of vinyl chloride, acrylic resin, and ultraviolet setting resin. The material for forming the surface coat 12 may be $SiO_2$ or $Al_2O_3$. Vaporization deposition in vacuum, preferably ionization vaporization deposition, may be used as means for providing the coat 12 of hard material. To increase the strength with which the coat 12 of hard material adheres to the flat disc 11 of soft resinous material, an intermediate layer 14 of Cr or Ni may be advantageously formed between the flat disc 11 and the coat 12. In operation, the stylus 6 is forced against the grinder pan of the aforesaid construction at a certain suitable angle as shown in FIG. 9, and a portion of the stylus 6 corresponding to the ridge 10 shown in FIG. 4 is ground by giving relative velocities to the grinder pan and the stylus. The condition in which grinding is performed as aforesaid is shown in FIGS. 10A and 10B. The use of the grinder pan according to the invention is advantageous as compared with the use of a diamond compound of the prior art in that since the former is covered with powdered grinding material in high density on its entire surface, the risk of the forward end of the stylus 6 missing the powdered grinding material and not being worked can be avoided, thereby eliminating the disadvantage of the prior art that the tip of the stylus is prevented from bring ground. When grinding is performed as shown in FIGS. 10A and 10B, a movement of a grinding material layer caused by a grinding pressure is substantially kept from taking place. Thus entry of the forward end of the stylus 6 into the grinder pan can be avoided, to enable chamfering to be affected with high precision finishes and allow an increase in yield to be achieved.

Figure 11:
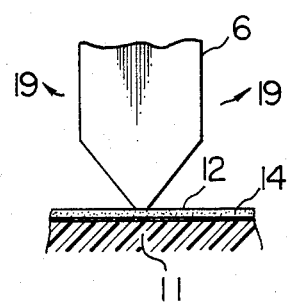
FIGS. 11, 12 and 13 are views in explanation of other embodiments of the grinding method in conformity with the invention.
Figure 12:
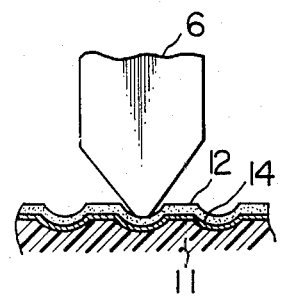
Figure 13:
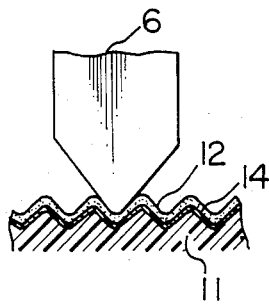

The method of grinding a stylus according to the invention can also be used with advantage for grinding a stylus to obtain a shape of the prior art wherein the ridge formed by the surfaces is rounded. When the grinding pan is used, the radius of rounding of the surface to be worked can be varied by altering the hardness of the resinous material forming the flat disc 11. When the grinder pan used has high hardness, it is possible to round a portion of the stylus 6 corresponding to the ridge 10 by giving the aforesaid relative velocities to the stylus 6 and the grinder pan while moving the stylus 6 in oscillating movement in a direction indicated by an arrow 19 in FIG. 11. Also, as shown in FIGS. 12 and 13, the flat disc 11 of soft resinous material may be formed beforehand with a spiral groove of a cross section in a transferable image of the desired shape of the stylus, and coated with the intermediate layer 14 and coat 12 of hard material to provide a grinder pan. The grinder pan provided in this way may be rotated and the stylus 6 may be forced thereagainst to conform to the groove while giving to the stylus a feed velocity synchronous with the pitch of the spiral groove oriented in a direction perpendicular to the direction in which grinding is performed. This enables stable rounding of the ridge to be achieved.

From the foregoing description, it will be appreciated that according to the invention it is possible to provide a stylus of a shape difficulty damaging the video disc in a reproducing mode in a video disc player of an electrostatic capacity type. Fabrication of the stylus of the desired shape can be readily effected, thereby markedly improving the yield of the styli. Also, by using the grinding method according to the invention, chamfering of the forward end portion and corners of the scanning surface of a stylus and rounding thereof can be readily effected, thereby markedly improving the yield of the styli.

What is claimed is:

1. A stylus suitable for use with a video disc player of a type in which signals representing changes in electrostatic capacity with respect to a video disc are detected, comprising:
   a scanning surface brought into contact with the video disc for scanning same;
   a plurality of inclined surfaces; and a plurality of ridges formed by said scanning surface and said inclined surfaces;

wherein the improvement resides in that:

at least one of several meeting points of said plurality of ridges located in a direction in which scanning is performed is chamfered to render the point blunt.

2. A stylus suitable for use with a video disc player of a type in which signal representing changes in electrostatic capacity with respect to a video disc are detected, comprising the following elements located on a side thereof positioned against the video disc:

a ridge-like portion defined by two inclined surfaces; and a scanning surface composed of a single surface portion or a plurality of surface portions brought into contact with the video disk to perform scanning;

wherein the improvement resides in that:

said stylus has a shape such that said surface portions of said scanning surface each have a forward end connected to said ridge-like portion through a surface-like portion connected to the respective surface portion in a straight line.

3. A method of grinding a stylus suitable for use with a video disc player of a type in which signals representing changes in electrostatic capacity with respect to a video disc are detected, comprising the step of:

performing grinding by forcing a forward end of said stylus against a grinder pan comprising a plate of soft resin having a coat of hard material applied to its surface.

4. A method of grinding a stylus as claimed in claim 3, wherein said plate of soft resin is formed of material selected from the group consisting of vinyl chloride, acrylic resin and ultraviolet setting resin, and said hard material is formed of material selected from the group consisting of $SiO_2$ and $Al_2O_3$.

5. A grinding method as claimed in claim 3, wherein said grinder pan further comprises an intermediate layer interposed between said plate of soft resin and said coat of hard material, said intermediate layer being formed of material selected from the group consisting of Cr and Ni.

* * * * *